(12) United States Patent
Adachi et al.

(10) Patent No.: US 8,253,021 B2
(45) Date of Patent: Aug. 28, 2012

(54) MOTOR CABLE DEVICE

(75) Inventors: Hideomi Adachi, Kosai (JP); Hidehiko Kuboshima, Kosai (JP); Kei Fujimoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 228 days.

(21) Appl. No.: 12/834,280

(22) Filed: Jul. 12, 2010

(65) Prior Publication Data

US 2011/0008993 A1   Jan. 13, 2011

(30) Foreign Application Priority Data

Jul. 13, 2009   (JP) ................. P. 2009-164428

(51) Int. Cl.
- *H02G 3/04* (2006.01)
- *H02G 3/30* (2006.01)
- *H01R 13/00* (2006.01)

(52) U.S. Cl. ............... 174/72 A; 174/68.1; 174/135; 439/445; 439/382

(58) Field of Classification Search .......... 174/68.1, 174/68.3, 135, 72 A, 72 R, 72 C, 73.1, 88 R, 174/95, 40 CC, 70 C; 439/445, 447, 448, 439/382; 385/60, 72, 78; 248/49, 68.1, 74.1; 180/65.1, 65.21, 65.31

See application file for complete search history.

(56) References Cited

U.S. PATENT DOCUMENTS

| | | | | |
|---|---|---|---|---|
| 4,840,333 A  * | 6/1989 | Nakayama | .................. | 248/68.1 |
| 4,874,908 A  * | 10/1989 | Johansson | .................. | 174/72 A |
| 5,105,054 A  * | 4/1992 | Kirma | .................. | 174/72 A |
| 7,172,042 B2 * | 2/2007 | Yamaguchi et al. | ......... | 180/65.1 |
| 7,559,511 B2 * | 7/2009 | Yon | .................. | 174/72 A |
| 7,592,546 B2 * | 9/2009 | Johansson | .................. | 174/95 |
| 7,645,157 B2 * | 1/2010 | Mizutani et al. | ............. | 439/382 |
| 8,129,621 B2 * | 3/2012 | Mizutani et al. | ............. | 174/135 |

FOREIGN PATENT DOCUMENTS

JP   2008-253017 A   10/2008

* cited by examiner

*Primary Examiner* — Angel R Estrada
(74) *Attorney, Agent, or Firm* — Sughrue Mion, PLLC

(57) ABSTRACT

Motors 1 and 2 are electrically connected to inverters 3 and 4 by a motor cable device 5 including connection/interference regulating member 8 which is installed at a predetermined position in a longitudinal direction of cable bodies 6 and 7. If in this connection state the motors 1 and 2 are driven or a vehicle is driven, vibration or impact is transferred to the motor cable device 5 from the motors 1 and 2 or the exterior, and thus the cable bodies 6 and 7 swing in an arrow direction. The swing contributes to the absorption of the vibration or the like.

4 Claims, 3 Drawing Sheets

MOTOR CABLE DEVICE

BACKGROUND

1. Field of the Invention

The present invention relates to a motor cable device capable of electrically connecting a motor and an inverter.

2. Background Art

Electric vehicles or hybrid vehicles include a motor serving as a power source, an inverter for generating three-phase alternating current which is required to drive the motor, and a motor cable device for connecting the motor and the inverter.

The motor cable device disclosed in Patent Document 1 below includes a cable body having a plurality of cables, a motor-side connection portion installed at one end portion of the cable body and serving as a connection portion of a motor, an inverter-side connection portion installed at the other end portion of the cable body and serving as a connection portion of an inverter, and a cable fixture installed at a middle portion of the cable body to fix the middle portion to a vehicle body.

The cable fixture is adapted to be fixed to the vehicle body using a dedicated attaching base and a dedicated fixing clamp. The cable fixture and the dedicated fixing base and fixing clamp are provided as fixing portions with respect to the vehicle body to suppress swing of the cable due to vibration or impact generated from the vehicle.

Patent Document 1: JP-A-2008-253017

However, the related art has the following problems. That is, there is a problem in that since the motor is the power source and also the vibration generating source, the generated vibration is transferred to the fixing portions through the cable body, and causes abnormal noise or damage the fixing portion if a structure clearance is big therein. In addition, there is another problem that there are cases where a fixing portion cannot be installed due to the structure of the vehicle.

The inventors came up with the idea of actively transferring the vibration generated from the motor or the vibration and impact generated from the vehicle to the cable body to swing the cable body, and absorbing the vibration or the like by the swing. In addition, the inventors think that since the fixing portion as Patent Document 1 can be made unnecessary by the above-mentioned idea, the problem can be solved.

However, in a case where there is a plurality of cable bodies, if the cable bodies swing, the cable bodies may be scratched due to interference between the cable bodies by the swing, and the cable bodies may collide with each other to have an influence on an electrical connection portion. In addition, in a case where there is a vehicle body or component in the vicinity of the cable body, the cable body may be damaged due to the interference between the cable body and the vehicle body or component.

SUMMARY

The present invention has been made in view of the above circumstances, and an object of the present invention is to provide a motor cable device capable of regulating interference and functioning a plurality of cable bodies as a vibration absorber while regulating the interference.

In a motor cable device of a first aspect of the present invention, a motor cable device that includes a plurality of cable bodies, a motor-side connection portion installed at each of one end portions of the plurality of the cable bodies, and an inverter-side connection portion installed at each of the other end portions of the plurality of cable bodies and that is capable of electrically connecting a motor and an inverter, wherein each of the plurality of cable bodies includes one or more thick high-voltage cables, and a connection/interference regulating member is installed at a predetermined position in a longitudinal direction of a cable to connect the plurality of cable bodies with each other and regulate interference of the cable bodies; and the plurality of cable bodies including the connection/interference regulating member is used as a vibration absorber which transfers vibration or impact from the motor or an exterior so that the cable bodies swing.

According to the present invention having the above feature, the vibration generated from the motor or the vibration and impact generated from the vehicle is actively transferred to the plurality of cable bodies to swing the plurality of cable bodies and thus the vibration or the like is absorbed by the swing. The present invention absorbs the vibration or impact by using the solidity and resilience of the thick high-voltage cable. Although the plurality of cable bodies itself swings, the interference is regulated by the connection/interference regulating member which is installed at the predetermined position.

In the motor cable device of a second aspect of the invention, with regards to the motor cable device which is described in the first aspect of the invention, the plurality of cable bodies are formed by installing a corrugated tube at an outside of the one or more thick high-voltage cables, the connection/interference regulating member has a winding portion wound around an outer surface of the corrugated tube, and the winding portion is provided with an engaging convex portion which is engaged with a tube concave portion of the corrugated tube.

According to the present invention having this feature, in a case where the plurality of cable bodies are provided with the corrugated tube installed at the outside, the connection/interference regulating member is configured to have the winding portion having the engaging convex portion which is wound around the outer surface of the corrugated tube. The connection/interference regulating member regulates movement of the plurality of cable bodies in a longitudinal direction of the cable or like, since the engaging convex portion is engaged with the tube concave portion of the corrugated tube and the winding portion is wound around the outer surface of the tube. That is, there is no interference between the cable bodies.

In the motor cable device set of a third aspect of the invention, with regards to the motor cable device which is described in the first aspect of the invention, the plurality of cable bodies are formed by installing a flexible member having a bendable property at an outside of the one or more thick high-voltage cables, and the connection/interference regulating member has a winding portion wound around an outer surface of the flexible member to compress the outer surface.

According to the present invention having this feature, the plurality of cable bodies are provided with the flexible member having a bendable property installed at the outside, the connection/interference regulating member is installed in such a way that the winding portion is wound around the flexible member. Since the winding portion is wound to compress the outer surface of the flexible member, the connection/interference regulating member regulates movement of the plurality of cable bodies in a longitudinal direction of the cable. That is, there is no interference between the cable bodies.

In the motor cable device of a fourth aspect of the invention, with regards to the motor cable device of the first aspect of the invention, a portion of an outer surface of the connection/interference regulating member is formed as a protection member against interference of a member or portion which exists in the vicinity of the plurality of cable bodies after the cable bodies are arranged.

According to the present invention having this feature, even though the plurality of cable bodies swing and the connection/interference regulating member interferes in a member or portion in the vicinity of the cable bodies, the interference does not affect the cable bodies.

According to the present invention of the first aspect of the invention, there is an effect of functioning the plurality of cable bodies as the vibration absorber while regulating the interference.

According to the present invention set forth in the second aspect of the invention, there is an effect of providing the cable body, of which the corrugated tube is installed at the outside, with a more preferable form of the connection/interference regulating member.

According to the present invention set forth in the third aspect of the invention, there is an effect of providing the cable body, of which the flexible member having the bendable property is installed at the outside, with a more preferable form of the connection/interference regulating member.

According to the present invention set forth in the fourth aspect of the invention, there is an effect of providing the cable body with a more preferable form of the connection/interference regulating member by adding a protection function, that is, a function of a protector, to the connection/interference regulating member.

DESCRIPTION OF THE PREFERRED EMBODIMENTS

A motor cable device employs a plurality of cable bodies including a connection/interference regulating member as a vibration absorber which transfers vibration or impact from a motor or an exterior so that the cable bodies swing.

Embodiment

Figure 1:
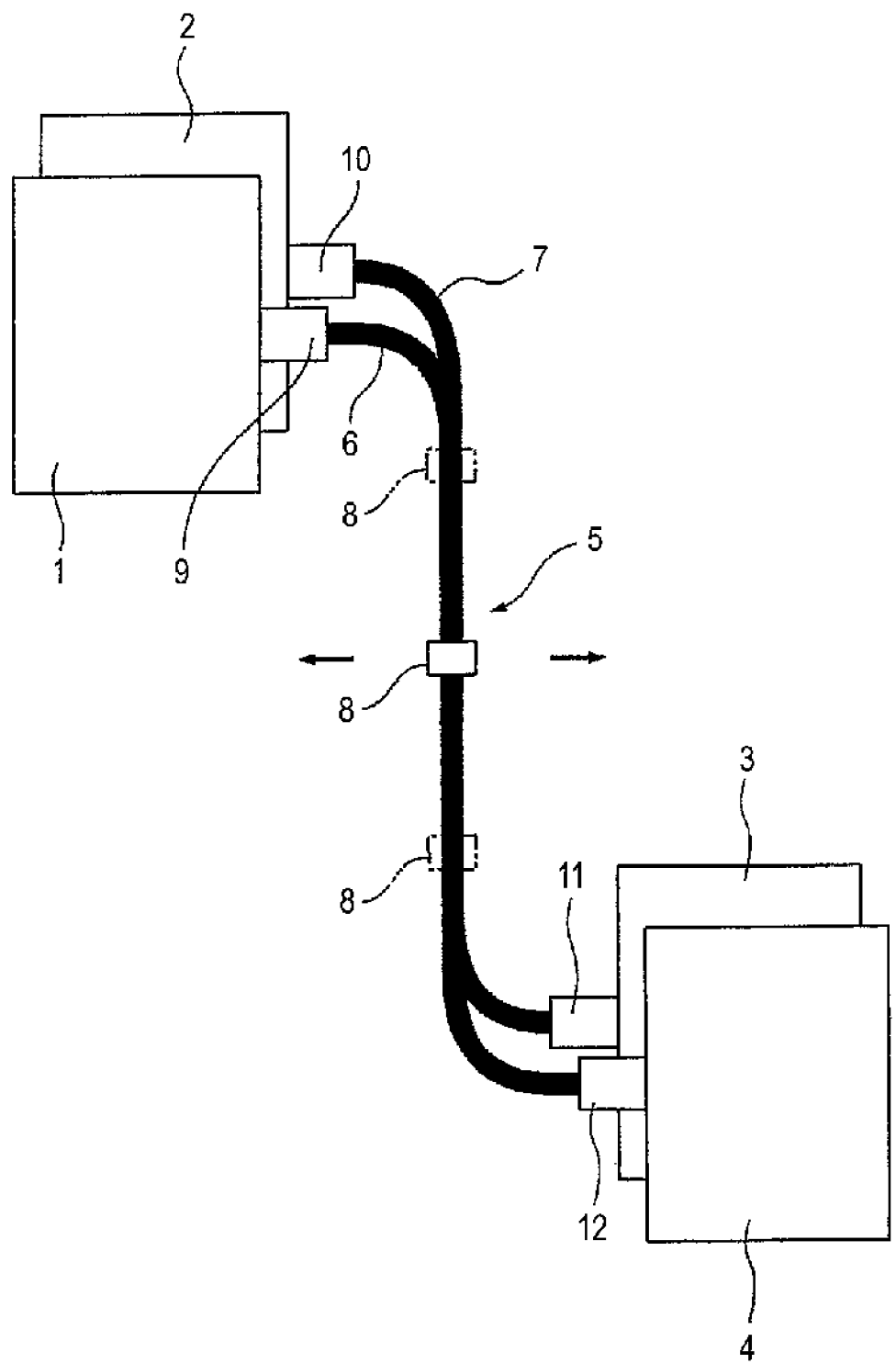
FIG. 1 is a diagram schematically illustrating a use state of a motor cable device according to the present invention.
Figure 2:
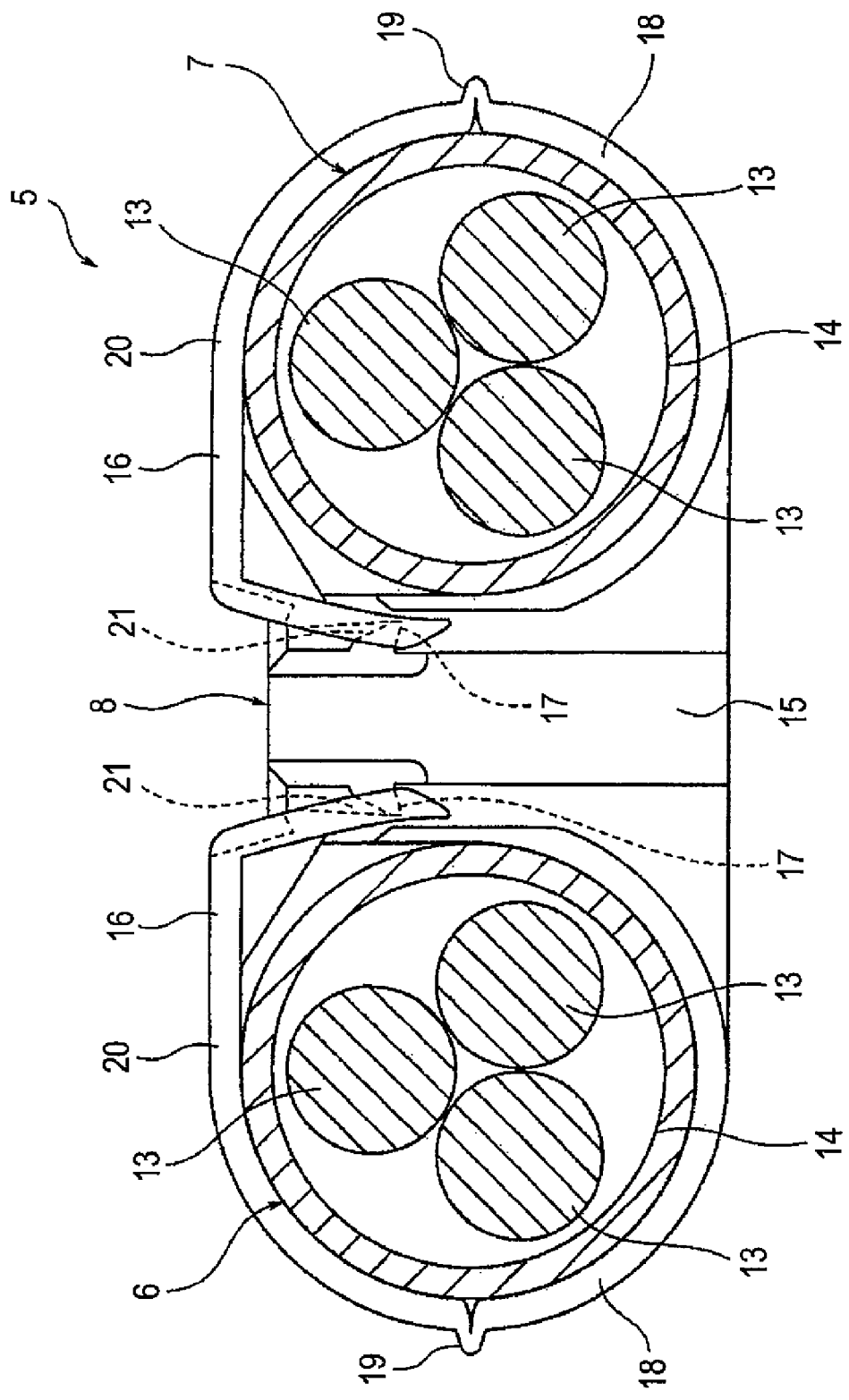
FIG. 2 is a cross-sectional view of a motor cable device at a position of a connection/interference regulating member.

Next, one embodiment will be described with reference to the accompanying drawings. FIG. 1 is a diagram schematically illustrating a use state of a motor cable device according to the present invention. FIG. 2 is a cross-sectional view of the motor cable device at a position of a connection/interference regulating member.

In FIG. 1, electric vehicles or hybrid vehicles include a motor and an inverter which are mounted at predetermined positions of the vehicle. In this embodiment, a vehicle including two motors 1 and 2 and two inverters 3 and 4 will be described herein (a vehicle of such a type is referenced with Patent Document 1). The motors 1 and 2 and are electrically connected to the inverters 3 and 4 by a motor cable device 5 of the present invention.

The motor cable device 5 includes two cable bodies 6 and 7, one or more connection/interference regulating members 8 installed at a predetermined position in a longitudinal direction of the cable bodies 6 and 7, motor-side connecting portions 9 and 10 installed at each end portions of the cable bodies 6 and 7, and inverter-side connecting portions 11 and 12 installed at each the other end portions of the cable bodies 6 and 7. The motor cable device 5 actively transfers vibration generated from the motors 1 and 2 or vibration and impact generated from the vehicle to the cable bodies 6 and 7, at which the connection/interference regulating member 8 is installed, to swing the cable bodies 6 and 7, for example, in an arrow direction in the figures, and thus absorb the vibration or the like by the swing. In other words, the motor cable bodies 6 and 7 are configured and constructed to use the cable bodies 6 and 7 provided with the connection/interference regulating member 8 as a vibration absorber.

As shown in FIGS. 1 and 2, the cable bodies 6 and 7 are basically identical to each other, and include three thick high-voltage cables 13, and a cable protection member 14 for accommodating the three thick high-voltage cables 13 in a batch. Although not limited thereto, the thick high-voltage cables 13 have a cable diameter of about 8 mm in this embodiment (the diameter including a sheath is about 8 mm, and the conductor consists of a twisted copper wire (containing a copper alloy, but aluminum may be contained).

The cable protection member 14 is adapted to protect the three thick high-voltage cables 13, and a corrugated tube is a preferable example in view of the manufacture and cost of the cable bodies 6 and 7. The corrugated tube has a flexible property, and has an advantage of not preventing the swing when the cable bodies 6 and 7 function as the vibration absorber. In this instance, in addition to the corrugated tube, a cable protection member, which is wrapped, for example, by a sheet material and is fixed by a tape or band or the like, may be used. In a case where the three thick high-voltage cables 13 are shielded in a batch, the use of the sheet material has an advantage of conveniently shielding the three thick high-voltage cables 13 in a batch. More specifically, for example, a cylindrical braid is installed at the outside of the three thick high-voltage cables 13, and the outside of the braid is wrapped and protected by the sheet material.

The connection/interference regulating member 8 is a member made of a synthetic resin material (metal material may be used), and is formed to connect the cable bodies 6 and 7 and to regulate the interference between the cable bodies. More specifically, as shown in FIG. 2, the connection/interference regulating member 8 includes an intervening portion 15 interposed between the cable bodies 6 and 7, and a pair of winding portions 16 connected to the intervening portion 15 and wound around the outer surface of the cable protection member 14. The connection/interference regulating member 8 is configured in such a way that a portion of the outer surface of the connection/interference regulating member 8 functions as a protection portion in the cable bodies 6 and 7, that is, a protector, against interference of the member or portion (not illustrated) which is positioned in the vicinity of the cable bodies 6 and 7, after the cable bodies 6 and 7 are arranged.

The intervening portion 15 is formed as a portion for maintaining a spacing between the cable bodies 6 and 7. In this instance, the spacing may be narrow or wide. The intervening portion 15 is not specifically limited to a specific shape if it does not obstruct the swing when the cable bodies 6 and 7 swing. The intervening portion 15 is provided with an engaging boss 17 for locking the winding portion 16.

The winding portion 16 includes a first portion 18 connected to the intervening portion 15, and a second portion 20 connected to the first portion 18 via a hinge 19. The first portion 18 is formed in the shape of a semicircle concave so as to hold a half of the cable bodies 6 and 7. The second portion 20 is formed in the shape of a band so as to be wound around the other half of the cable bodies 6 and 7. The second portion 20 is provided with a locking portion 21 which is locked to the locking boss 17 of the intervening portion 15.

Figure 3:
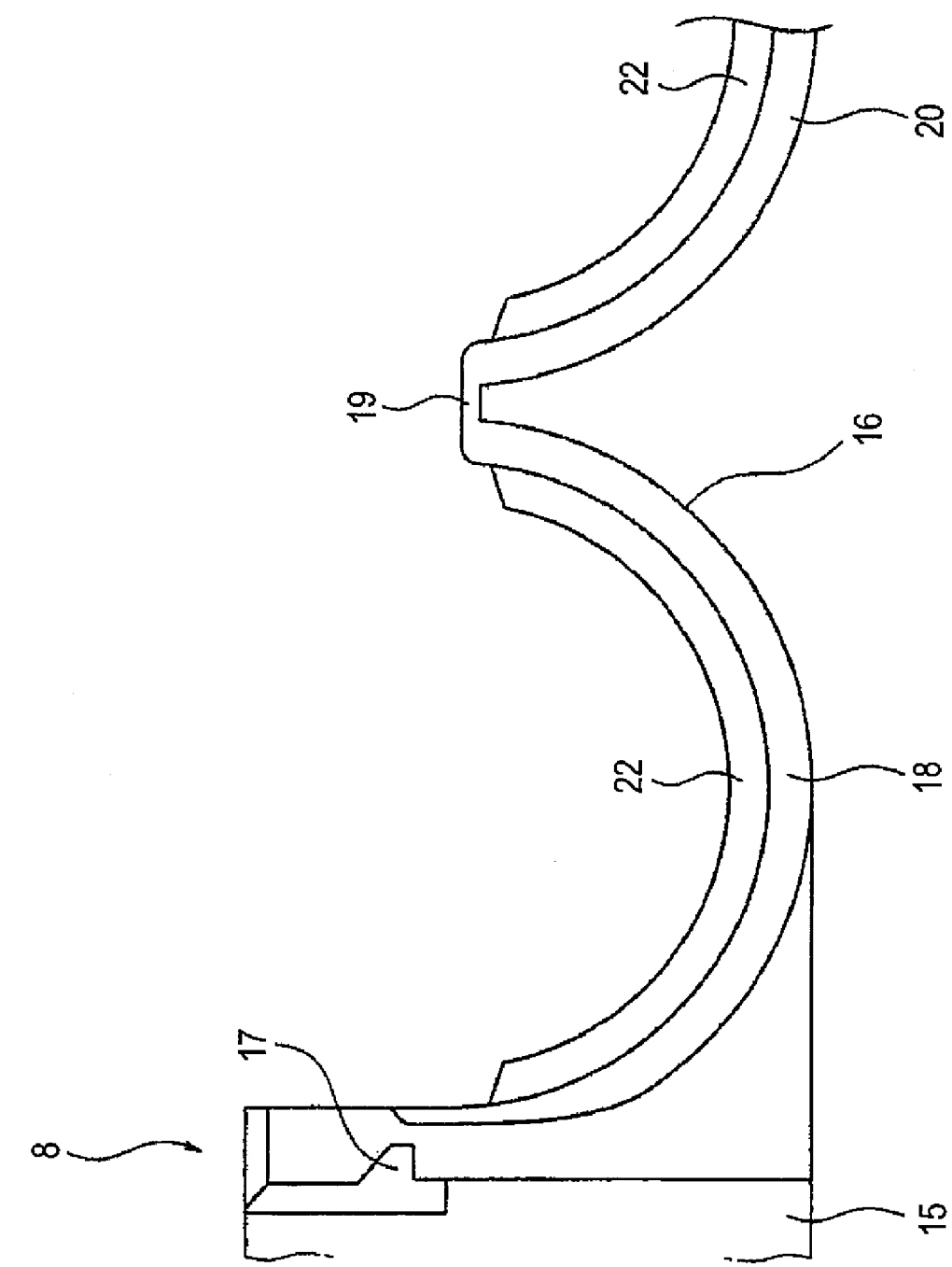
FIG. 3 is a view illustrating a modified example of a connection/interference regulating member.

According to the winding portion 16, if the cable protection member 14 is a corrugated tube, the engaging convex portion 22 (refer to FIG. 3) engaging with the tube concave portion of the corrugated tube is preferably formed at the first portion 18 and the second portion 20. In this instance, a rib is formed to have a protruding height lower than the engaging convex portion 22 of FIG. 3, and may be applied if the cable protection member 14 is a sheet material. If the engaging convex portion 22 or the like can regulate movement of the cable in a longitudinal direction thereof, it is sufficient.

The motor-side connection portions 9 and 10 are basically identical to each other, and include a terminal clamp (not illustrated) installed at each distal end of the three thick high-voltage cables 13, and an insulated housing (not illustrated) which accommodates and fixes the terminal clamps respectively. Since the motor-side connection portions 9 and 10 employ the construction known in the art (since the construction is known, the detailed description thereof will be omitted herein. In this instance, in the case where the connection portions are shielded by a braid, it further includes an earth portion (not illustrated) earthed to the motor 1 or 2, and a metal shell (not illustrated) which connects and fixes the braid to the earth portion).

The inverter-side connection portions 11 and 12 are basically identical to each other, and include a terminal clamp (not illustrated) installed at each distal end of the three thick high-voltage cables 13, and an insulated housing (not illustrated) which accommodates and fixes the terminal clamps respectively. The inverter-side connection portions 11 and 12 employ the construction known in the art (since the construction is known, the detailed description thereof will be omitted herein. In this instance, in the case where the connection portions are shielded by a braid, it includes the same configuration as that of the motor-side connection portions 9 and 10).

In the configuration and structure, as shown in FIG. 1, the motors 1 and 2 are electrically connected to the inverters 3 and 4 by the motor cable device 5 including the connection/interference regulating member 8 which is installed at the predetermined position in the longitudinal direction of the cable bodies 6 and 7. If in this connection state the motors 1 and 2 are driven or a vehicle is driven, the vibration or impact is transferred to the motor cable device 5 from the motors 1 and 2 or the exterior, and thus the cable bodies 6 and 7 swing in the arrow direction. The swing contributes to the absorption of the vibration or the like. The swing of the cable bodies 6 and 7 does not swing in a flapping manner due to the solidity and resilience of the thick high-voltage cable 13, and can absorb the vibration properly. The cable bodies 6 and 7 are provided with the connection/interference regulating member 8 to prevent interference of the cable bodies 6 and 7. Accordingly, it does not affect the electrical connection portion. Since the connection/interference regulating member 8 has the function of the so-called protector, even though the member or portion existing in the vicinity of the cable bodies 6 and 7 may be interfered with, it does not affect the cable bodies 6 and 7.

The present invention can be variously modified within the claimed scope without changing the gist of the present invention.

In the above-mentioned description, although three thick high-voltage cables 13 are accommodated in a batch by the cable protection member 14, it is not limited thereto. The cable protection member (corrugated tube, sheet material or the like) may be installed for each one of the thick high-voltage cables 13. In this instance, the shape of the connection/interference regulating member 8 is changed depending upon the number of the thick high-voltage cables 13.

What is claimed is:

1. A motor cable device that includes a plurality of cable bodies, a motor-side connection portion installed at each of one end portions of the plurality of the cable bodies, and an inverter-side connection portion installed at each of the other end portions of the plurality of cable bodies and that is capable of electrically connecting a motor and an inverter,
wherein each of the plurality of cable bodies includes one or more thick high-voltage cables, and a connection/interference regulating member is installed at a predetermined position in a longitudinal direction of a cable to connect the plurality of cable bodies with each other and regulate interference of the cable bodies; and
the plurality of cable bodies including the connection/interference regulating member is used as a vibration absorber which transfers vibration or impact from the motor or an exterior so that the cable bodies swing.

2. The motor cable device as claimed in claim 1, wherein the plurality of cable bodies are formed by installing a corrugated tube at an outside of the one or more thick high-voltage cables, the connection/interference regulating member has a winding portion wound around an outer surface of the corrugated tube, and the winding portion is provided with an engaging convex portion which is engaged with a tube concave portion of the corrugated tube.

3. The motor cable device as claimed in claim 1, wherein the plurality of cable bodies are formed by installing a flexible member having a bendable property at an outside of the one or more thick high-voltage cables, and the connection/interference regulating member has a winding portion wound around an outer surface of the flexible member to compress the outer surface.

4. The motor cable device as claimed in claim 1, wherein a portion of an outer surface of the connection/interference regulating member is formed as a protection member against interference of a member or portion which exists in the vicinity of the plurality of cable bodies after the cable bodies are arranged.

* * * * *